United States Patent
Raghu

(10) Patent No.: US 9,120,563 B2
(45) Date of Patent: Sep. 1, 2015

(54) FLOW CONTROL ACTUATOR WITH AN ADJUSTABLE FREQUENCY

(71) Applicant: The Boeing Company, Chicago, IL (US)

(72) Inventor: Surya Raghu, Ellicott City, MD (US)

(73) Assignee: THE BOEING COMPANY, Chicago, IL (US)

( * ) Notice: Subject to any disclaimer, the term of this patent is extended or adjusted under 35 U.S.C. 154(b) by 373 days.

(21) Appl. No.: 13/652,865

(22) Filed: Oct. 16, 2012

(65) Prior Publication Data

US 2014/0102542 A1  Apr. 17, 2014

(51) Int. Cl.
*F15C 1/22* (2006.01)
*B64C 21/08* (2006.01)
*B64C 21/04* (2006.01)

(52) U.S. Cl.
CPC .............. *B64C 21/08* (2013.01); *B64C 21/04* (2013.01); *B64C 2230/04* (2013.01); *B64C 2230/06* (2013.01); *B64C 2230/18* (2013.01); *Y02T 50/166* (2013.01)

(58) Field of Classification Search
CPC ..................................... F15C 1/08; F15C 3/16
USPC .......... 137/834, 833, 835, 825, 826, 829, 831
See application file for complete search history.

(56) References Cited

U.S. PATENT DOCUMENTS

| | | | |
|---|---|---|---|
| 3,302,398 A | 2/1967 | Taplin et al. | |
| 3,376,881 A * | 4/1968 | Godwin | 137/832 |
| 3,448,752 A | 6/1969 | O'Neill | |
| 3,942,559 A * | 3/1976 | Kranz et al. | 137/831 |
| 4,151,955 A * | 5/1979 | Stouffer | 239/11 |
| 4,291,395 A * | 9/1981 | Holmes | 367/83 |
| 4,313,470 A | 2/1982 | Tippetts | |
| 4,721,251 A * | 1/1988 | Kondo et al. | 239/412 |
| 4,774,975 A * | 10/1988 | Ayers et al. | 134/168 C |
| 5,181,660 A * | 1/1993 | Stouffer et al. | 239/589.1 |
| 5,971,301 A * | 10/1999 | Stouffer et al. | 239/589.1 |
| 6,009,180 A | 12/1999 | Andersson | |
| 6,805,164 B2 | 10/2004 | Stouffer | |
| 7,080,664 B1 * | 7/2006 | Ayer | 137/832 |
| 7,096,888 B1 * | 8/2006 | Thurston et al. | 137/818 |
| 7,128,082 B1 | 10/2006 | Cerretelli et al. | |
| 8,277,116 B2 | 10/2012 | Winkler et al. | |
| 2008/0149205 A1 | 6/2008 | Gupta et al. | |
| 2008/0279041 A1 | 11/2008 | Winkler et al. | |
| 2011/0005334 A1 | 1/2011 | Haynes et al. | |

OTHER PUBLICATIONS

Woszidlo et al., "Parametric Study of Sweeping Jet Actuators for Separation Control," 5th Flow Control Conference, Jun. 2010, 21 Pages.

(Continued)

*Primary Examiner* — John K Fristoe, Jr.
*Assistant Examiner* — Minh Le
(74) *Attorney, Agent, or Firm* — Yee & Associates, P.C.

(57) ABSTRACT

A method and apparatus comprising a structure and a chamber within the structure. The structure has an input port and an output port. The chamber is configured to channel a fluid from the input port to the output port of the structure. A volume of the chamber is configured to change such that a frequency at which the fluid flows out of the output port changes at the output port.

18 Claims, 13 Drawing Sheets

(56) References Cited

OTHER PUBLICATIONS

Gokoglu et al., "Numerical Studies of a Supersonic fluidic Diverter Actuator for Flow Control," 5th Flow Control Conference, Jun. 2010, 16 Pages.

Guyot et al., "Active Combustion Control Using a Fuidic Oscillator for Asymmetric Fuel Flow Modulation," 44th AIAA/ASME/SAE/ASEE Joint Propulsion Conference and Exhibit, Jul. 2008, 19 Pages.

Crittenden et al., "Combustion Powered Actuator with Integrated High Frequency Oscillator," International Conference on Jets, Wakes, and Separated Flows, Sep. 2008, 8 Pages.

Guyot et al., A Fluidic Actuator for Active Combustion Control, Proceedings of the GT2008 ASME Turbo Expo 2007: Power for Land, See and Air, Jun. 2008, 13 Pages.

Guyot et al., "Active Control of Combustion Instability Using a Fluidic Actuator," 46th AIAA Aerospace Sciences Meeting and Exhibit, Jan. 2008, 12 Pages.

Gregory et al., "Characterization of a Micro Fluidic Oscillator for Flow Control," 2nd AIAA Flow Control Conference, Jun. 2004, 14 Pages.

Raman et al., "Jet thrust vectoring using a miniature flu8idic oscillator," The Aeronautical Journal of the Royal Aeronautical Society, Mar. 2005, 11 Pages.

Raman et al., "Cavitity Resonance Suppression Using Miniature Fluidic Oscillators," Technical Notes, AIAA Journal, vol. 42, No. 12, Dec. 2004, 4 Pages.

Sakaue et al., "Porous Pressure-Sensitive Paint for Characterizing Unsteady Flowfields," AIAA Journal, vol. 40, No. 6, Jun. 2002, 5 Pages.

Gregory et al., "Variable-Frequency Fluidic Oscillator Driven by Piezoelectric Devices," 43rd AIAA Aerospace Sciences Meeting and Exhibit, Jan. 2005, 12 Pages.

Raman et al., "Evaluation of Flip-Flop Jet Nozzles for Use as Practical Excitation Devices," Journal of Fluids Engineering, vol. 116, Sep. 1994, pp. 508-515.

Raman et al., "Jet Mixing Control Using Excitation from Miniature Oscillating Jets," Technical Notes, AIAA Journal, vol. 33, No. 2, Feb. 1995, pp. 365-368.

Raman et al., "Miniature Fluidic Oscillators for Flow and Noise Control," AIAA 2000-2554, Fluids 2000 Conference and Exhibit, Jun. 2000, 16 Pages.

"NASA Langley's Flow Control Devices," Langley Research Center, National Aeronautics and Space Administraction, Mar. 2012, 2 Pages.

Gregory et al., "Variable-Frequency Fluidic Oscillator Driven by a Piezoelecctric Bender," AIAA Journal, vol. 47, No. 11, Nov. 2009, pp. 2717-2725.

Gregory et al., "Switching Behavior of a Plasma-Fluidic Actuator," 45th AIAA Aerospace Sciences Meeting and Exhibit, Jan. 2007, 11 Pages.

Raghu, "Externally Driven Flow Control Actuator," U.S. Appl. No. 13/652,891, filed Oct. 16, 2012, 47 pages.

\* cited by examiner

FLOW CONTROL ACTUATOR WITH AN ADJUSTABLE FREQUENCY

CROSS-REFERENCE TO RELATED APPLICATION

This application is related to the following patent application: entitled "Externally Driven Flow Control Actuator", application Ser. No. 13/652,891, filed even date hereof, assigned to the same assignee, and incorporated herein by reference.

BACKGROUND INFORMATION

1. Field

The present disclosure relates generally to aircraft and, in particular, to fluid flow for an aircraft. Still more particularly, the present disclosure relates to a method and apparatus for controlling the aerodynamics of an aircraft using a flow control actuator having a variable frequency.

2. Background

In operating an aircraft, fluid flow control systems may be used for desired operation of the aircraft and the components within or on the aircraft. These fluid flow control systems may be used during different phases of operation of the aircraft. For example, these systems may be used during take-off, in flight, landing, taxiing on the runway, or during other phases of operation while the aircraft is in service. These fluid flow control systems may be used to control the flow of fluid over, in, or through various portions of an aircraft during these phases of operation.

Flow control actuators may be used in a fluid flow control system to maintain a desired flow of a fluid such as air. These flow control actuators may be used to maintain a desired flow of fluid in an aircraft for many different purposes. For example, flow control actuators may be used in jet inlet and exhaust systems, environmental systems, control surface systems, and other systems in an aircraft. Flow control actuators may be used to maintain desired boundary layers on control surfaces, to reduce noise, or to control fluid flow for other suitable purposes within the aircraft.

A currently used flow control actuator may take the form of a fluidic oscillator. This type of flow control actuator is designed to produce a flow of fluid moving in a sweeping manner from side to side at an output port of the flow control actuator. These oscillations of fluid flow occur at a particular frequency. The fluid flow output by a fluidic oscillator that moves in a sweeping manner may be referred to as a sweeping jet.

Changing the frequency of the flow of fluids sweeping from side to side to control fluid flow in a particular system may be desirable in some cases. This frequency may be changed to provide a desired fluid flow for a particular aircraft structure by changing the flow rate of fluid into the fluidic oscillators. Currently, the frequency of the flow of fluid out of a fluidic oscillator may be changed by replacing the fluidic oscillator with another fluidic oscillator. Replacement may be undesirable when dynamic control of fluid flow by the fluid flow system is desired.

Further, the frequency of oscillations in fluidic oscillators may be changed during operation of the fluidic oscillator by altering the supply pressure of the fluid to the fluid oscillator. However, in some cases, changing the fluid flow through the fluidic oscillator may not be desirable. For example, changing the fluid flow may use more energy than desired in the source of the fluid flow for the fluidic oscillator. In other cases, increased maintenance may be needed for the fluid source supplying fluid to the fluidic oscillator. Therefore, it would be desirable to have a method and apparatus that takes into account at least some of the issues discussed above, as well as possibly other issues.

SUMMARY

In one illustrative embodiment, an apparatus comprises a structure and a chamber within the structure. The structure has an input port and an output port. The chamber is configured to channel a fluid from the input port to the output port of the structure. A volume of the chamber is configured to change such that a frequency at which the fluid flows out of the output port changes at the output port.

In another illustrative embodiment, a fluidic oscillator comprises a structure, a main chamber in the structure, a first secondary chamber in the structure, and a second secondary chamber in the structure. The structure has an input port and an output port. The main chamber in the structure is in communication with the input port and the output port. A fluid flowing from the input port through the main chamber flows between a first side and a second side of the main chamber. The first secondary chamber in the structure is in communication with the main chamber. The second secondary chamber in the structure is in communication with the main chamber. At least of one the first secondary chamber and the second secondary chamber is configured to change a volume of the main chamber such that a frequency at which the fluid sweeps at the output port changes.

In yet another illustrative embodiment, a method for managing a flow of fluid is present. The fluid is received at an input port of a structure. The fluid is sent through a chamber in communication with the input port. The fluid is caused to flow from the chamber and out of an output port with a frequency that changes based on a change in a volume of the chamber.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that changing the pressure in the input of the fluidic oscillator may only change the frequency by an amount that may not be sufficient for the desired frequency range.

Additionally, the illustrative embodiments also recognize and take into account that changing the pressure of the fluid supplied to the fluidic oscillator may also change the velocity, momentum, or both the velocity and the momentum of the fluid that flows out of the fluidic oscillator. This type of change in output also may be undesirable in some cases. Further, changing the pressure from a fluid source such as a bleed air supply or an auxiliary power unit to provide desired frequency in the fluidic oscillator may require the use of more energy than desired.

Thus, the illustrative embodiments provide a method and apparatus for controlling the fluid output from an apparatus such as a fluidic oscillator. The illustrative embodiments may be applied to any apparatus that generates fluid flow at an output port that changes frequency in the movement of the fluid flow that sweeps between a first side and a second side at the output port.

In one illustrative embodiment, an apparatus comprises a structure and a chamber within the structure. The structure has an input port and an output port. The chamber is configured to channel a fluid from the input port to the output port of the structure. A volume of the chamber is configured to change such that a frequency at which the fluid flow changes directions when flowing out of the output port changes.

In these illustrative examples, the frequency of the flow of fluid may be the rate, manner, or both the rate and manner of the fluid flow in a particular direction. This direction may be in a sweeping fashion from side to side. More specifically, the fluid may flow out of the output port in a stream that may move from side to side at a particular frequency. In other words when the flow of fluid sweeps at the output port, the flow of fluid moves from side to side. The side to side movement may not actually touch the sides of the output port, depending on the implementation.

Figure 1:
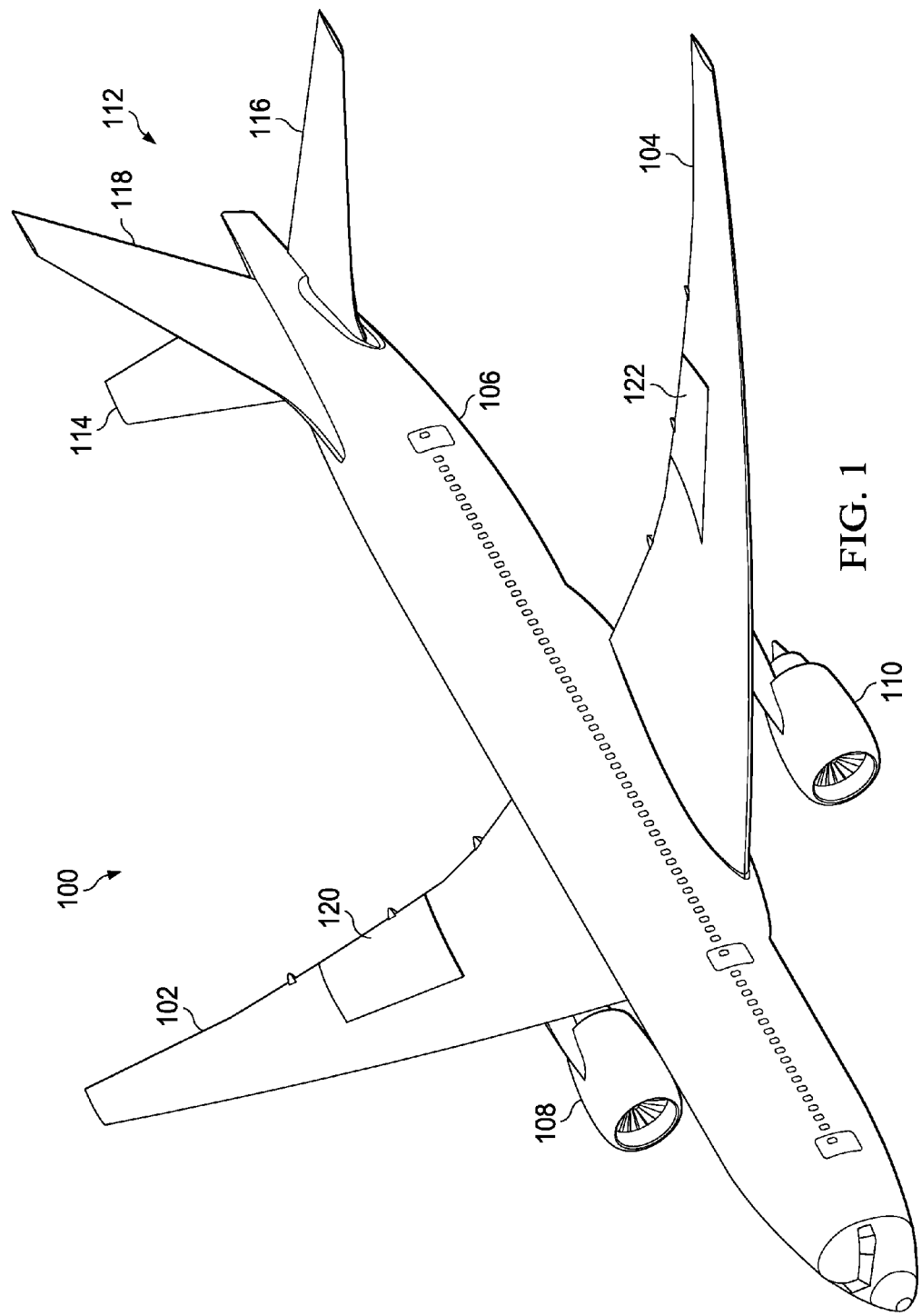
FIG. 1 is an illustration of an aircraft in accordance with an illustrative embodiment.

With reference now to the figures and, in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which flow control actuators may be implemented to control the flow of fluid for aircraft 100. In particular, flow control actuators in the form of fluidic oscillators may be implemented in aircraft 100 to perform various functions such as maintaining a desired airflow. For example, fluid oscillators may be used to maintain desired airflow such as a boundary layer over wing 102, wing 104, horizontal stabilizer 114, horizontal stabilizer 116, and vertical stabilizer 118.

Further, fluid oscillators also may be employed to control surfaces such as flap 120 and flap 122. As another illustrative example, fluid oscillators may be used with engine 108 and engine 110 as well as other structures to reduce noise generated by aircraft 100.

Figure 2:
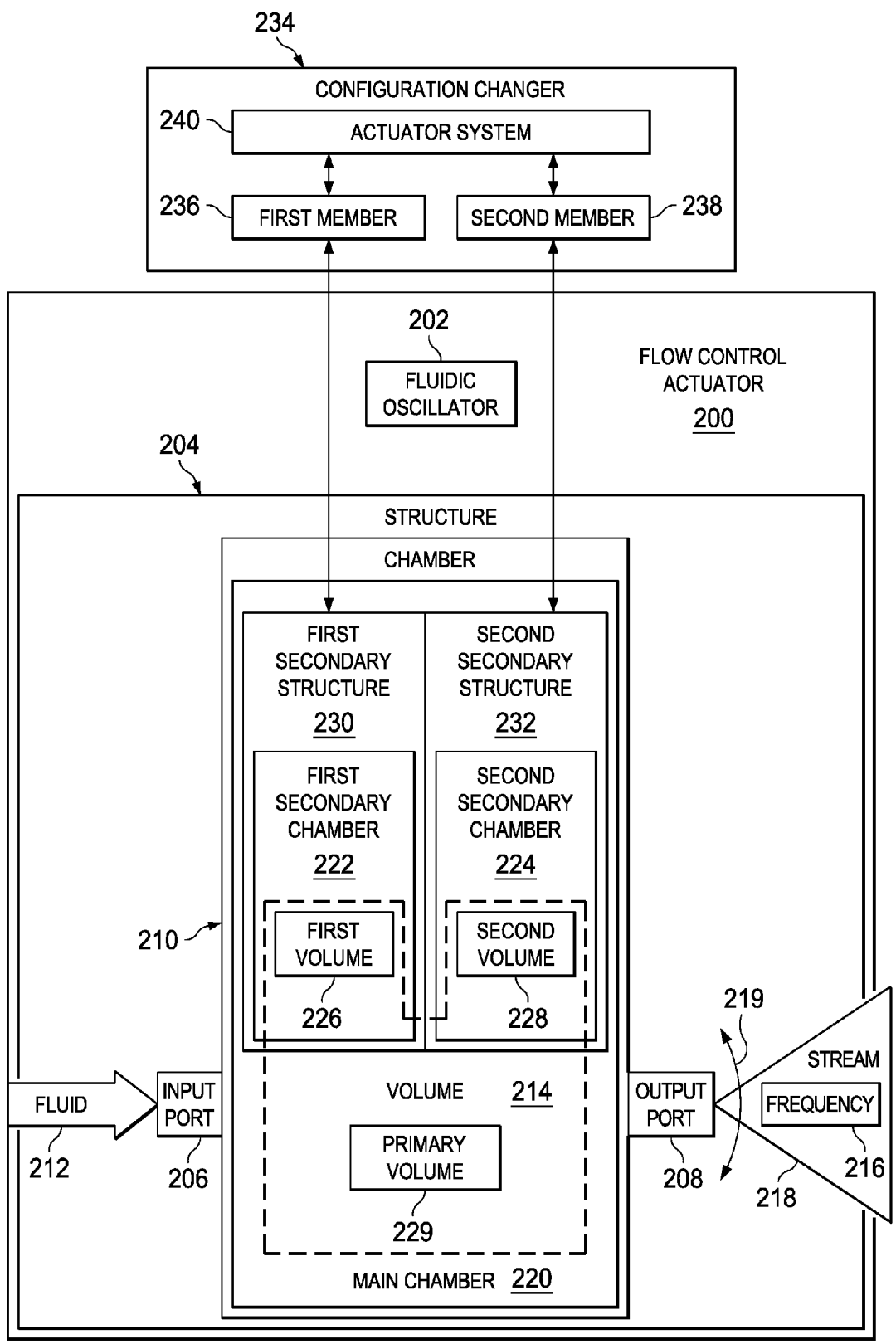
FIG. 2 is an illustration of a block diagram of a flow control actuator in accordance with an illustrative embodiment.

Turning now to FIG. 2, an illustration of a block diagram of a flow control actuator is depicted in accordance with an illustrative embodiment. In this illustrative example, flow control actuator 200 may be used in aircraft 100 in FIG. 1.

As depicted, flow control actuator 200 may take the form of fluidic oscillator 202. In this illustrative example, flow control actuator 200 is comprised of structure 204 having input port 206 and output port 208. Additionally, chamber 210 is located within structure 204. In this illustrative example, chamber 210 is an enclosed space in structure 204. Structure 204 may be comprised of a material selected from one of a metal, plastic, steel, aluminum, titanium, polycarbonate, or other suitable types of materials.

As depicted, chamber 210 is configured to channel fluid 212 from input port 206 to output port 208 of structure 204. Fluid 212 may be, for example, without limitation, air, nitrogen, carbon dioxide, a liquid fuel, a gas fuel, or some other suitable type of fluid.

In this illustrative example, chamber 210 has volume 214. Volume 214 of chamber 210 is configured to change in size in these illustrative examples. The change in the size of volume 214 of chamber 210 is configured to change such that frequency 216 at which fluid 212 flows out from output port 208 changes at output port 208.

In this illustrative example, fluid 212 flows in the form of stream 218. Stream 218 sweeps with frequency 216. In these illustrative examples, stream 218 moves in a sweeping motion from side to side as depicted by arrow 219. In these illustrative examples, stream 218 may take the form of a jet stream of air.

In these illustrative examples, chamber 210 includes main chamber 220, first secondary chamber 222, and second secondary chamber 224. Main chamber 220 is in communication with input port 206 and output port 208. First secondary chamber 222 is in communication with main chamber 220. In a similar fashion, second secondary chamber 224 is also in communication with main chamber 220.

In these illustrative examples, first secondary chamber 222 has first volume 226 and second secondary chamber 224 has second volume 228. Main chamber 220 has primary volume 229. First volume 226, second volume 228, and primary volume 229 form volume 214.

In these illustrative examples, at least one of first secondary chamber 222 and second secondary chamber 224 is configured to change volume 214 for chamber 210. As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

First volume 226 and second volume 228 are configured to be changed through a change in the configuration of first secondary chamber 222 and second secondary chamber 224. A change in first volume 226, second volume 228, or both first volume 226 and second volume 228 changes volume 214 for chamber 210.

As depicted, structure 204 includes first secondary structure 230 and second secondary structure 232. First secondary chamber 222 is located within first secondary structure 230. Second secondary chamber 224 is located within second secondary structure 232. First secondary structure 230 and second secondary structure 232 may be formed as part of structure 204 or may be otherwise associated with structure 204.

When one component is "associated" with another component, the association is a physical association in these depicted examples. For example, a first component may be considered to be associated with a second component by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

Configuration changer 234 may change first secondary chamber 222 and second secondary chamber 224 to change volume 214 of structure 204. In particular, configuration changer 234 may change at least one of first volume 226 of first secondary chamber 222 and second volume 228 of second secondary chamber 224. In other words, these two volumes may be changed at the same time or at different times. Further, the two volumes may be changed by different amounts.

In this illustrative example, configuration changer 234 may change first volume 226 of first secondary chamber 222 and second volume 228 of second secondary chamber 224 in a number of different ways. For example, first volume 226 and second volume 228 may be changed using actuator system 240 in configuration changer 234. For example, actuator system 240 may move first member 236 and second member 238 to change first volume 226 and second volume 228. More specifically, first member 236 is associated with first secondary chamber 222, and second member 238 is associated with second secondary chamber 224.

As depicted, first member 236 and second member 238 may be moved in and out of first secondary chamber 222 and second secondary chamber 224, respectively. Movement of first member 236 into first secondary chamber 222 reduces first volume 226. Similarly, movement of second member 238 into second secondary chamber 224 reduces second volume 228.

Movement of first member 236 out of first secondary chamber 222 increases first volume 226. In a similar fashion, movement of second member 238 out of second secondary chamber 224 increases second volume 228.

In other illustrative examples, first secondary structure 230 and second secondary structure 232 may change in configuration to change first volume 226 and second volume 228. For example, first secondary structure 230 and second secondary structure 232 may be comprised of a material that causes first secondary chamber 222 and second secondary chamber 224 to change in size, which causes a change to first volume 226 and second volume 228, respectively. For example, first secondary structure 230 and second secondary structure 232 may be comprised of material selected from at least one of shape memory material, an elastic material, and some other suitable type of material.

The illustration of flow control actuator 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, two additional secondary chambers may be used in addition to or in place of first secondary chamber 222 and second secondary chamber 224. These chambers also may change in configuration to change the volumes of those chambers to change volume 214 of chamber 210.

In this illustrative example, configuration changer 234 is shown as a separate component from flow control actuator 200. In some illustrative examples, configuration changer 234 may be considered part of flow control actuator 200.

In yet another illustrative example, configuration changer 234 may be implemented using a different component in addition to or in place of actuator system 240. In still other illustrative examples, configuration changer 234 may use a current source in place of actuator system 240. The current source may be used when first secondary structure 230 and second secondary structure 232 are comprised of a shape memory material. The current source may apply a current to change the configuration of first secondary structure 230 and second secondary structure 232 in a manner that changes first volume 226 of first secondary chamber 222 and second volume 228 of second secondary chamber 224.

Alternatively, configuration changer 234 may include a heat source when the shape memory material used for first secondary structure 230 and second secondary structure 232 change shape in response to temperature changes. As yet another illustrative example, configuration changer 234 may include clamps or vices that may squeeze first secondary structure 230 and second secondary structure 232 to reduce first volume 226 and second volume 228 when these structures are comprised of elastic materials. These clamps or vices may then open to increase first volume 226 and second volume 228.

In some illustrative examples, actuator system 240 may not be used, or may be used in combination with another type of configuration changer 234. For example, first volume 226 and second volume 228 may be configured to change using at least one of a piston, an actuator, a shape memory material, and an elastic material.

Figure 3:
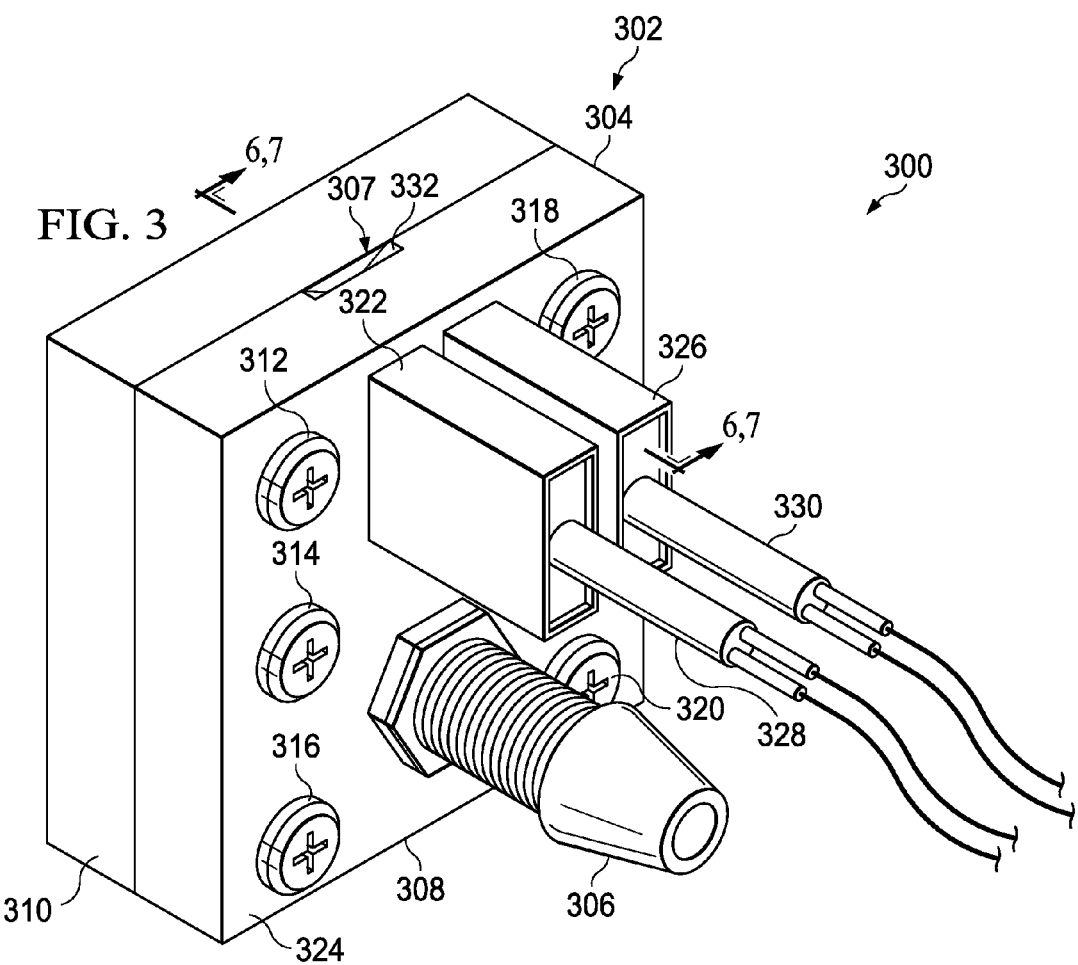
FIG. 3 is an illustration of a flow control actuator in accordance with an illustrative embodiment.

Turning now to FIG. 3, an illustration of a flow control actuator is depicted in accordance with an illustrative embodiment. Flow control actuator 300 is an example of one physical implementation of flow control actuator 200 shown in block form in FIG. 2. As depicted, flow control actuator 300 may be fluidic oscillator 302.

In this illustrative example, flow control actuator 300 is comprised of structure 304 having input port 306 and output port 307. Structure 304 is an example of an implementation of structure 204 shown in block form in FIG. 2. Input port 306 and output port 307 are examples of physical implementations for input port 206 and output port 208 shown in block form in FIG. 2.

As depicted in this particular example, structure 304 is comprised of more than one part. In particular, structure 304 is comprised of first planar member 308 and second planar member 310. These planar members may be connected to each other through fastener 312, fastener 314, fastener 316, fastener 318, fastener 319 (not shown), and fastener 320.

First secondary structure 322 extends from surface 324 of first planar member 308. Second secondary structure 326 also extends from surface 324 of first planar member 308. First secondary structure 322 and second secondary structure 326 are examples of physical implementations for first secondary structure 230 and second secondary structure 232 shown in block form in FIG. 2. In this illustrative example, first secondary structure 322 and second secondary structure 326 have a cross section with a shape of a rectangle.

In this illustrative example, first actuator 328 and second actuator 330 are associated with first secondary structure 322 and second secondary structure 326, respectively. First actuator 328 and second actuator 330 are examples of physical implementations for configuration changer 234 with actuator system 240 shown in block form in FIG. 2. First actuator 328 and second actuator 330 may be operated to change the volume in first secondary structure 322 and second secondary structure 326.

In this illustrative example, input port 306 extends from surface 324 of first planar member 308. Input port 306 is configured to be connected to a fluid source. For example, input port 306 may be connected to a bleed air source or an auxiliary power unit in these depicted examples.

As depicted, output port 307 is located on first planar member 308 on inner side 332 of structure 304. In this illustrative example, fluid flows out of output port 307 in a direction that moves with a selected frequency.

Figure 4:
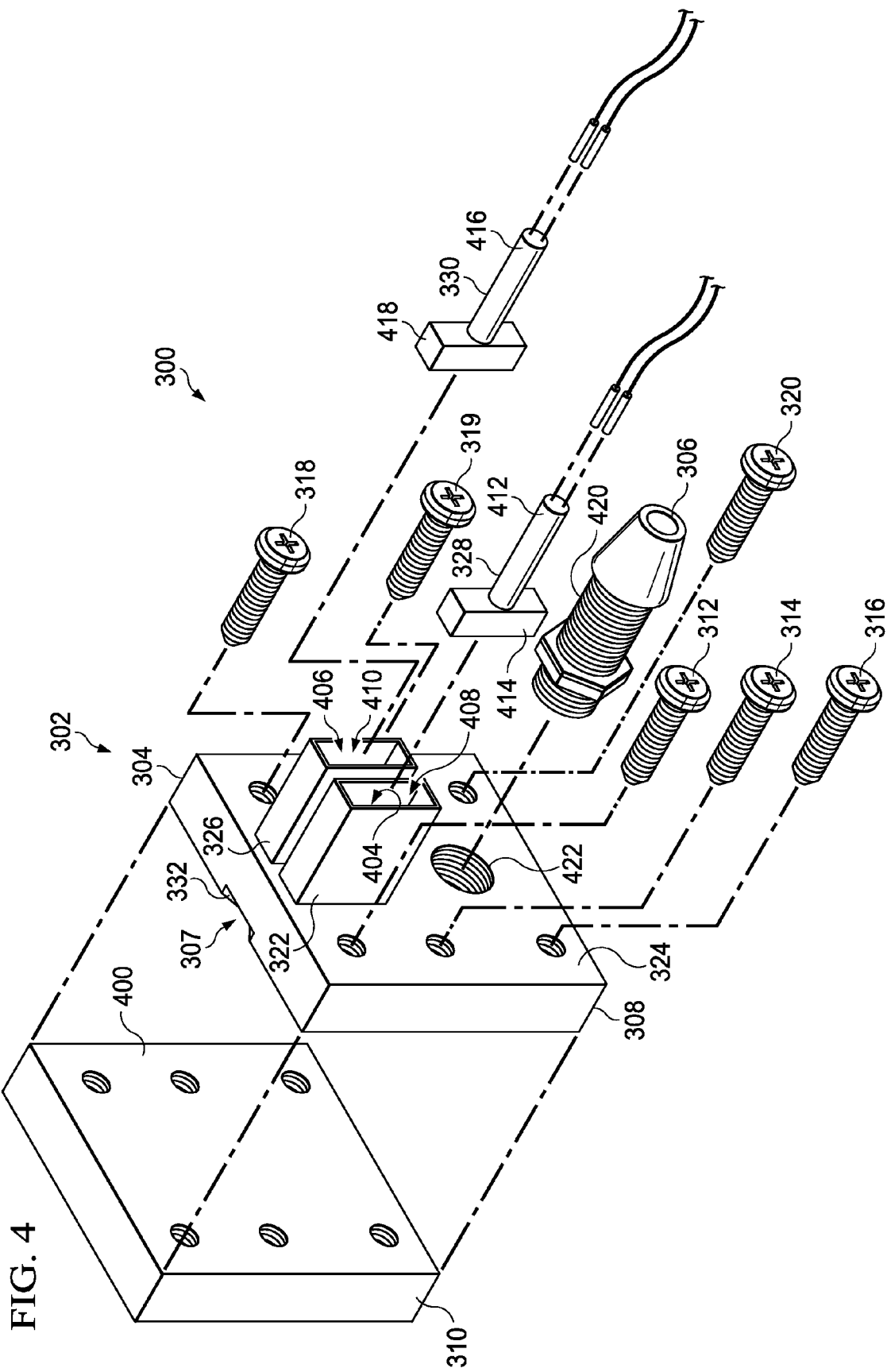
FIG. 4 is an exploded view of a flow control actuator in accordance with an illustrative embodiment.

Turning now to FIG. 4, an exploded view of a flow control actuator is depicted in accordance with an illustrative embodiment. In this exploded view of flow control actuator 300, inner side 400 of second planar member 310 is shown. Inner side 400 may contact inner side 332 of first planar member 308 when first planar member 308 and second planar member 310 are connected to each other.

As depicted in this exploded view, first secondary structure 322 has first secondary chamber 404 and second secondary structure 326 has second secondary chamber 406. First secondary chamber 404 has first volume 408, and second secondary chamber 406 has second volume 410. As depicted, first volume 408 may be changed in size by first actuator 328. In a similar fashion, second volume 410 may be changed in size by second actuator 330.

In this illustrative example, first actuator 328 includes housing 412 and extendable section 414. In a similar fashion, second actuator 330 includes housing 416 and extendable section 418. The extendable sections may move relative to the housings. For example, movement of extendable section 414 relative to housing 412 may change the size of first volume 408 in first secondary chamber 404. Movement of extendable section 418 relative to housing 416 may change the size of second volume 410 in second secondary chamber 406.

Extendable section 414 and extendable section 418 have a shape and include a material configured to generate a seal when these sections extend into first secondary chamber 404 and second secondary chamber 406, respectively. The materials may include, for example, wear resistant material such as Polytetrafluoroethylene (PTFE), a self-lubricating material such as a graphite embedded metal, and other suitable materials.

As depicted, input port 306 is comprised of connector 420 and opening 422. Connector 420 may be placed into opening 422 to form input port 306.

Figure 5:
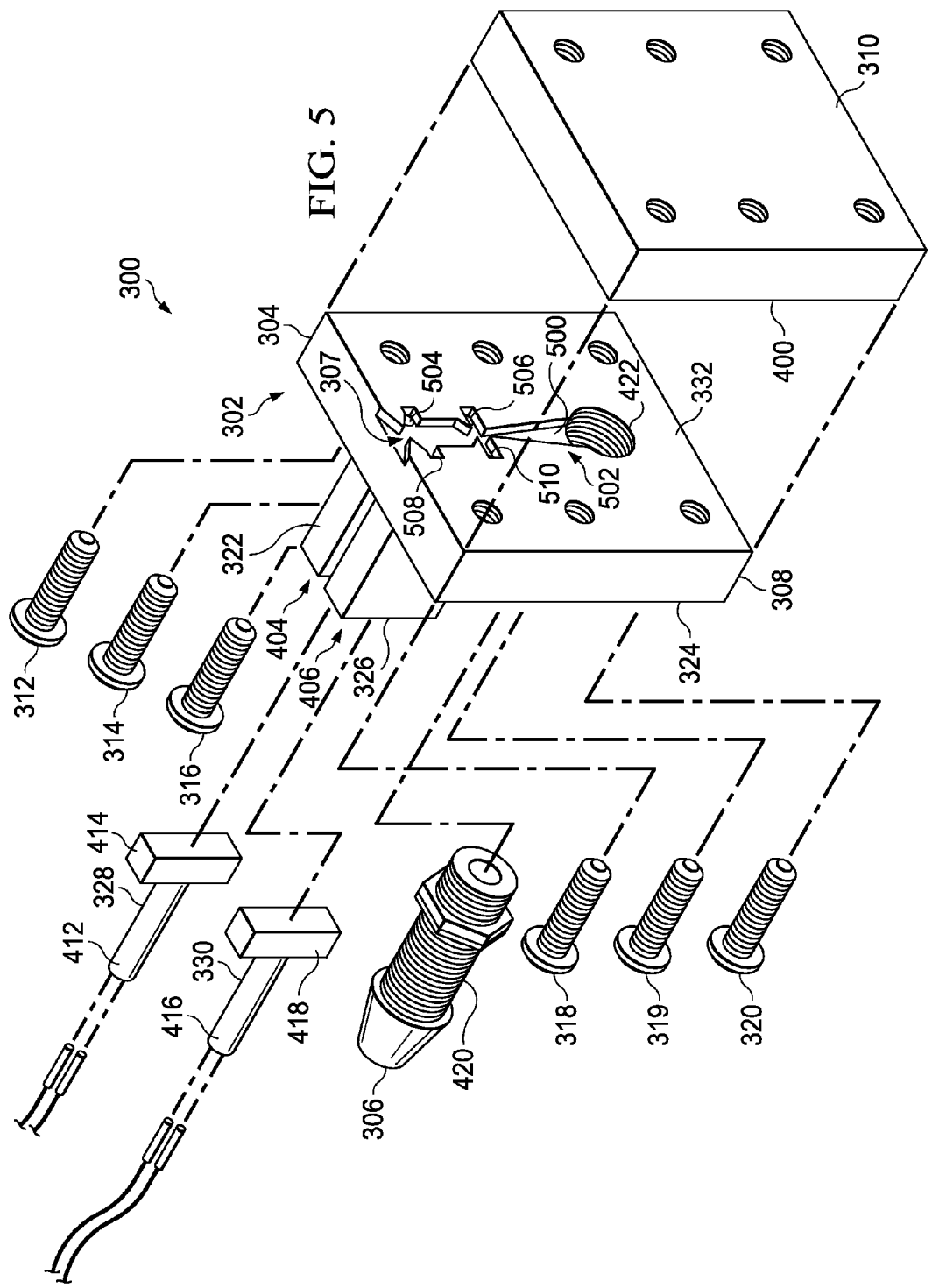
FIG. 5 is another illustration of an exploded view of a flow control actuator in accordance with an illustrative embodiment.

Turning now to FIG. 5, another illustration of an exploded view of a flow control actuator is depicted in accordance with an illustrative embodiment. In this exploded view of flow control actuator 300, main chamber 500 is seen on inner side 332 of first planar member 308. Main chamber 500 has volume 502 in this illustrative example.

As depicted, main chamber 500 is in communication with first secondary chamber 404 and second secondary chamber 406. In these illustrative examples, opening 504 and opening 506 provide communication between first secondary chamber 404 and main chamber 500. Opening 508 and opening 510 provide communication between second secondary chamber 406 and main chamber 500. In these illustrative examples, these openings may take the form of channels or holes that extend through first planar member 308. As can be seen in this exploded view, main chamber 500 is also in communication with opening 422 for input port 306 as well as output port 307.

Figure 6:
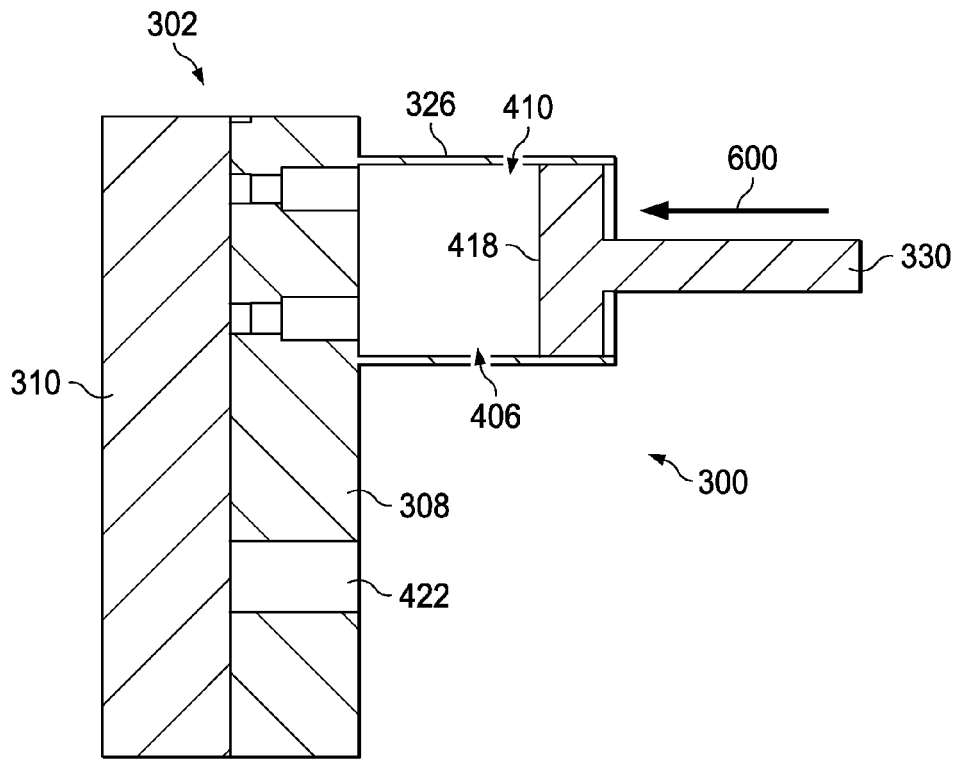
FIG. 6 is an illustration of a cross-sectional view of a flow control actuator in accordance with an illustrative embodiment.

With reference now to FIG. 6, an illustration of a cross-sectional view of a flow control actuator is depicted in accordance with an illustrative embodiment. As depicted, flow control actuator 300 is shown in a cross-sectional view taken along lines 6-6 in FIG. 3.

In this view, extendable section 418 for second actuator 330 is shown in an unextended state. Other components in second actuator 330, such as housing 416 and motors within housing 416, are not shown in this cross-sectional view. These components are not shown to illustrate the effect of extendable section 418 in a manner that does not obscure this illustration and description of the movement of extendable section 418.

As illustrated, second volume 410 for second secondary chamber 406 has the greatest size when extendable section 418 is in this unextended state. Movement of extendable section 418 into second secondary chamber 406 in the direction of arrow 600 reduces the size of second volume 410.

Figure 7:
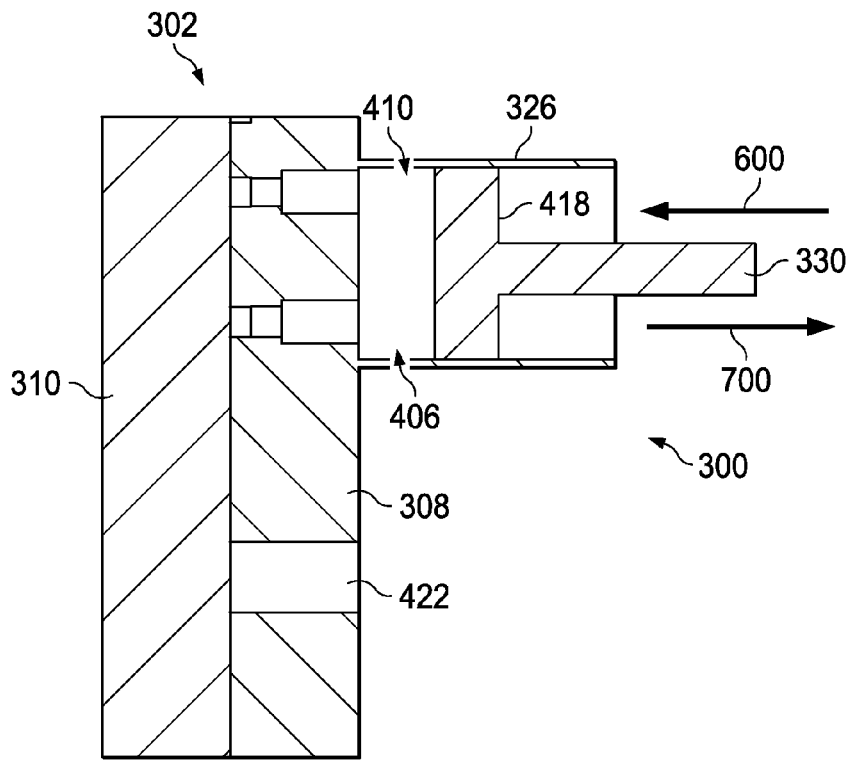
FIG. 7 is an illustration of a cross-sectional view of a flow control actuator in accordance with an illustrative embodiment.

With reference now to FIG. 7, an illustration of a cross-sectional view of a flow control actuator is depicted in accordance with an illustrative embodiment. As depicted, flow control actuator 300 is shown in a cross-sectional view taken along lines 7-7 in FIG. 3.

In this illustrative example, extendable section 418 is shown in a partially extended state. In this view, extendable section 418 has been moved in the direction of arrow 600. With this movement of extendable section 418, second volume 410 in second secondary chamber 406 is reduced in size as compared to FIG. 6. In this manner, movement of extendable section 418 may be used to change second volume 410 for second secondary chamber 406.

This change of second volume 410 may occur during operation of flow control actuator 300. In other words, the change in second volume 410 may occur dynamically while fluid flows through flow control actuator 300. A similar change may be made to first volume 408 for first secondary chamber 404 through movements of extendable section 414.

Movement of extendable section 418 in the direction of arrow 700 increases second volume 410 from the current size in these illustrative examples. In this manner, at least one of first volume 408 and second volume 410 may be changed in size during operation of flow control actuator 300. By changing at least one of first volume 408 in first secondary chamber 404 and second volume 410 in second secondary chamber 406, the frequency at which fluid flowing from output port 307 changes direction may be adjusted. In these illustrative examples, the direction is a side to side movement of a stream of fluid.

Figure 8:
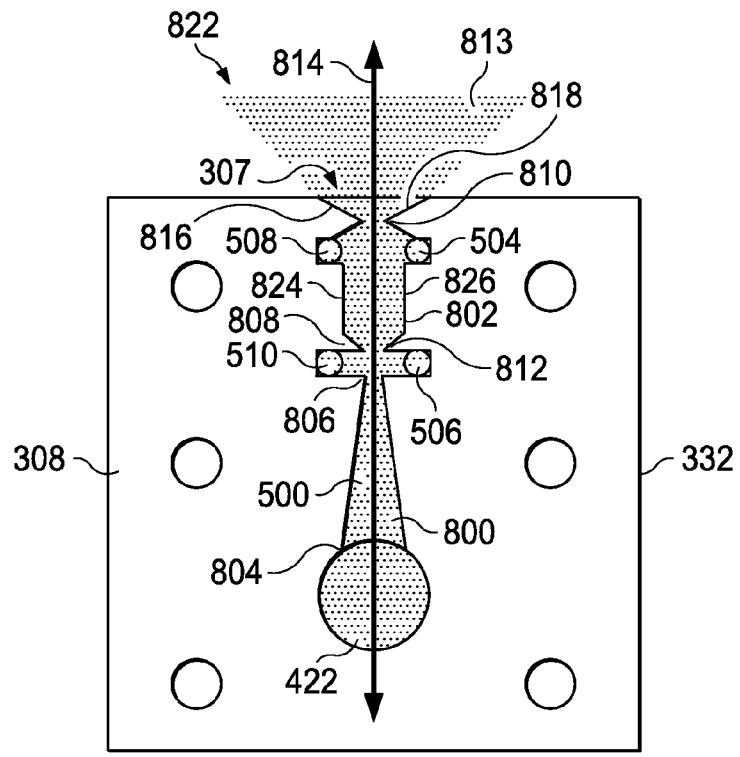
FIG. 8 is an illustration of an inner side of a first planar member in a flow control actuator in accordance with an illustrative embodiment.

With reference now to FIG. 8, an illustration of an inner side of a first planar member in a flow control actuator is depicted in accordance with an illustrative embodiment. In this figure, inner side 332 of first planar member 308 from FIG. 3 is illustrated.

As can be seen in this illustrative example, first planar member 308 has main chamber 500. Main chamber 500 includes first section 800 and second section 802. First section 800 of main chamber 500 is in communication with opening 422 of input port 306 in FIG. 3 at first end 804 of first section 800. First section 800 may be configured to receive fluid 813 from input port 306 and may cause fluid 813 to flow at a desired rate. Second end 806 of first section 800 is in communication with first end 808 of second section 802 of main chamber 500. In this illustrative example, second end 810 of second section 802 is in communication with output port 307.

As used herein, a first component, first end 804 of first section 800, "connected to" a second component, second section 802, means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

In this illustrative example, second end 806 of first section 800 is connected to first end 808 of second section 802 by section 812. Section 812 has a rectangular shape that is in communication with opening 506 and opening 510.

Additionally, opening 504 and opening 508 also are located proximal to second end 810 of second section 802 in this illustrative example. The configuration of opening 504, opening 506, opening 508, and opening 510 is such that fluid 813 flowing through main chamber 500 does not merely flow out of output port 307 in a direction about axis 814. Instead, these openings are configured such that fluid flow out of output port 307 oscillates in a side to side fashion between first side 816 and second side 818 of output port 307 in this illustrative example.

Further, fluid 813 may flow out of output port 307 in a stream. This stream may have various forms, such as a jet, a cone, a fan shape, or some other suitable form.

As can be seen in this illustrative example, when fluid 813 flows out of flow control actuator 300 at output port 307, fluid 813 may spread out to cover area 822. As depicted, area 822 represents an extent of flow for fluid 813.

The extent of area 822 outside of flow control actuator 300 may depend on the configuration of output port 307. Output port 307 may be made such that area 822 may be wider or narrower, or have other configurations depending on the particular implementation.

In this illustrative example, second section 802 of main chamber 500 is configured to cause fluid 813 to oscillate between first side 824 of second section 802 and second side 826 of second section 802. This oscillation between first side 824 and second side 826 is configured to cause an oscillation of fluid 813 as it exits flow control actuator 300 at output port 307.

More specifically, some of fluid 813 flowing from first section 800 toward second section 802 of main chamber 500 may flow into first secondary chamber 404 through opening 506 in section 812. This fluid may then flow back into second section 802 through opening 504. This flow of fluid 813 through first secondary chamber 404 may affect the oscillation of fluid 813 through second section 802 of main chamber 500.

In a similar fashion, some of fluid 813 flowing from first section 800 toward second section 802 of main chamber 500 may flow into second secondary chamber 406 through opening 510. Further, the portion of fluid 813 that flows into second secondary chamber 406 may flow back into second section 802 through opening 508. This flow of fluid 813 through second secondary chamber 406 may also contribute to the oscillation of fluid 813 in second section 802 of main chamber 500.

In this manner, the portions of fluid 813 that flow through first secondary chamber 404 and second secondary chamber 406 may cause fluid 813 to oscillate within second section 802, which in turn causes oscillation of fluid 813 when fluid 813 flows out of output port 307. The frequency of this oscillation may be adjusted by adjusting first volume 408 in first secondary chamber 404 and second volume 410 in second secondary chamber 406.

Further, fluid 813 flows between first side 824 and second side 826 in second section 802 of main chamber 500 at a frequency that may be changed. The amount of change selected in at least one of first volume 408 in first secondary chamber 404 and second volume 410 in second secondary chamber 406 may affect an amount of time that fluid 813 remains flowing on first side 824 and second side 826 in second section 802 of main chamber 500.

Figure 9:
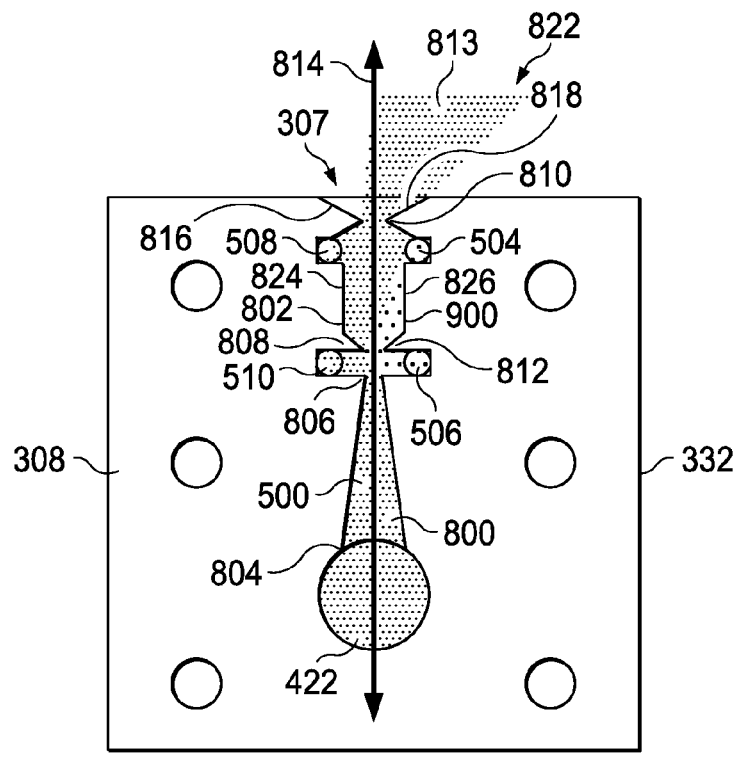
FIGS. 9-11 are illustrations of oscillations of fluid flow for a flow control actuator in accordance with an illustrative embodiment.
Figure 10:
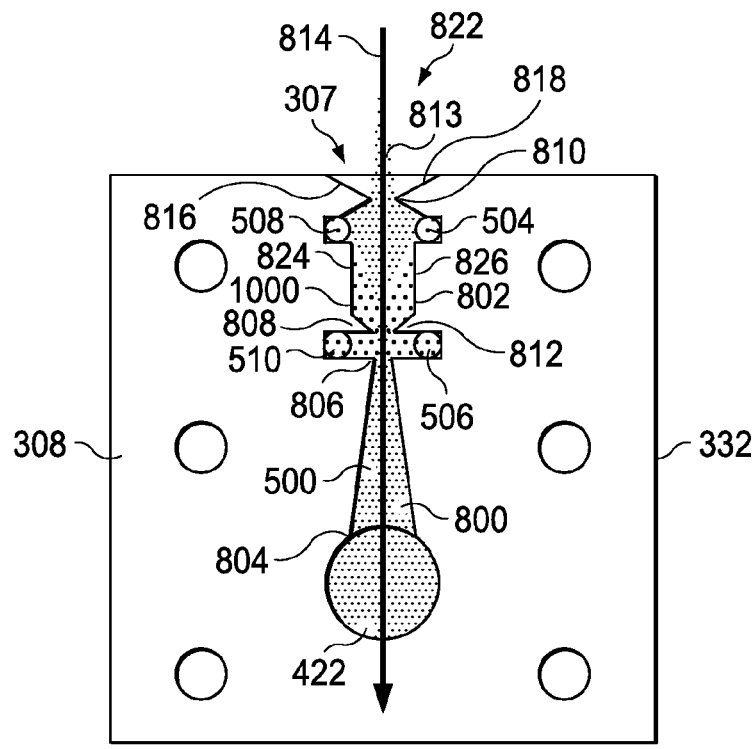
Figure 11:
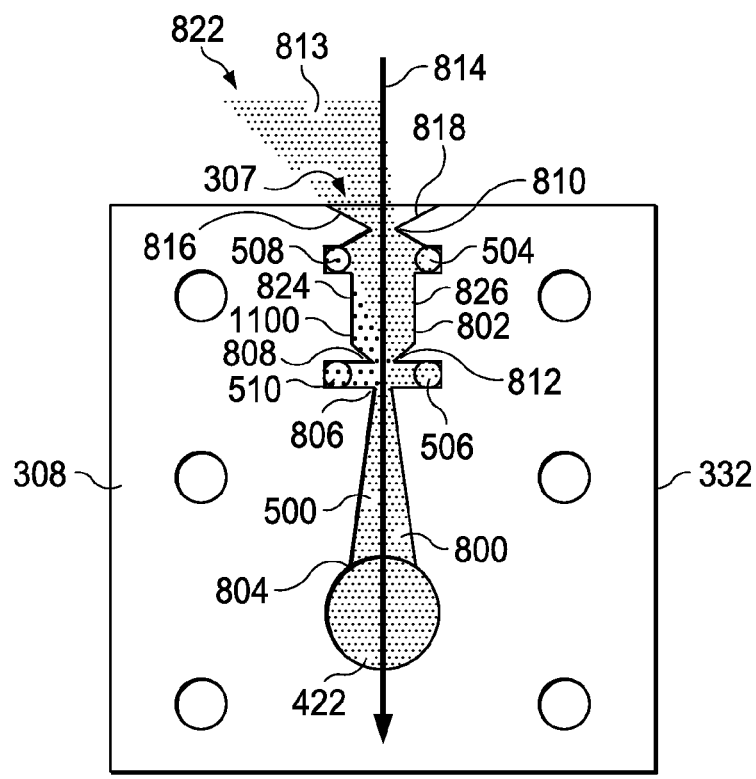

Turning now to FIGS. 9-11, illustrations of oscillations of fluid flow for a flow control actuator are depicted in accordance with an illustrative embodiment. In FIG. 9, an illustration of fluid flow out of a flow control actuator is shown. In this illustration, fluid 813 flows through second section 802 such that fluid is present on first side 824 with an absence of fluid 813 on a portion of second side 826 in second section 802 of main chamber 500. This flow of fluid 813 results in fluid 813 flowing out of output port 307 toward second side 826 with a flow of fluid 813 in area 900 on first side 824 being substantially absent.

In FIG. 10, an illustration of a flow of fluid out of a flow control actuator is depicted in accordance with an illustrative embodiment. Within main chamber 500, fluid 813 sweeps or moves to flow out of output port 307 from second side 826 toward first side 824. Fluid 813 flowing within second section 802 of main chamber 500 flows mainly about axis 814 as the flow of fluid 813 shifts from flowing on first side 824 to second side 826. Flow of fluid 813 is substantially absent in area 1000 in second section 802 of main chamber 500 in this example.

As depicted, fluid 813 flows out of output port 307 in a direction substantially along axis 814. In this illustration, the flow of fluid 813 has moved toward second side 818 and is moving away from first side 816 of output port 307.

Turning now to FIG. 11, an illustration of a flow of fluid out of a flow control actuator is depicted in accordance with an illustrative embodiment. In this depicted example, fluid 813 flows through second section 802 of main chamber 500 with fluid 813 being mostly against second side 826 rather than first side 824. Fluid flow is substantially absent from area 1100 on first side 824 of second section 802 of main chamber 500 in these illustrative examples. This type of flow through second section 802 results in fluid 813 flowing out of output port 307 at second side 826 of output port 307.

This shift in fluid flow may be caused by the communication of main chamber 500 with first secondary chamber 404 and second secondary chamber 406. The rate of oscillation, or the frequency, may be based on the size of first volume 408 and second volume 410. If first volume 408 is not the same size as second volume 410, fluid 813 may flow on one side of output port 307 longer than another side of output port 307.

Figure 12:
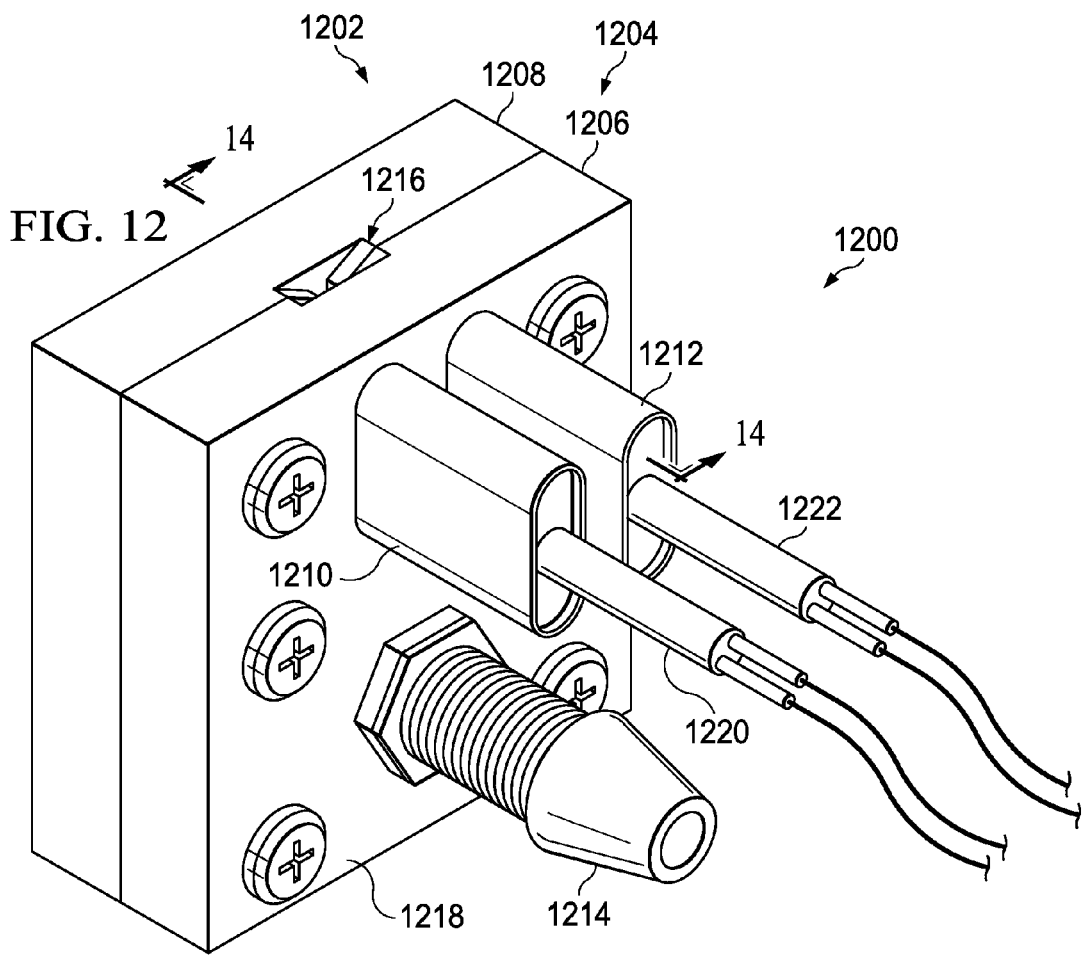
FIG. 12 is an illustration of a flow control actuator in accordance with an illustrative embodiment.

Turning now to FIG. 12, an illustration of a flow control actuator is depicted in accordance with an illustrative embodiment. In this depicted example, flow control actuator 1200 takes the form of fluidic oscillator 1202. Flow control actuator 1200 is an example of another physical implementation for flow control actuator 200 shown in block form in FIG. 2.

In this illustrative example, structure 1204 is comprised of first planar member 1206, second planar member 1208, first secondary structure 1210, and second secondary structure 1212. Structure 1204 has input port 1214 and output port 1216.

In this illustrative example, input port 1214 extends from surface 1218 of first planar member 1206. In this illustrative example, output port 1216 is not located just in first planar member 1206. Output port 1216 is located in both first planar member 1206 and second planar member 1208 in this illustrative example. Additionally, first solenoid valve 1220 and second solenoid valve 1222 are associated with first secondary structure 1210 and second secondary structure 1212, respectively.

Additionally, first secondary structure 1210 and second secondary structure 1212 have a different shape as compared to first secondary structure 322 and second secondary structure 326 in FIG. 3. First secondary structure 1210 and second secondary structure 1212 have a cross section that is more of an oval as opposed to a rectangle for first secondary structure 322 and second secondary structure 326 in FIG. 3.

Figure 13:
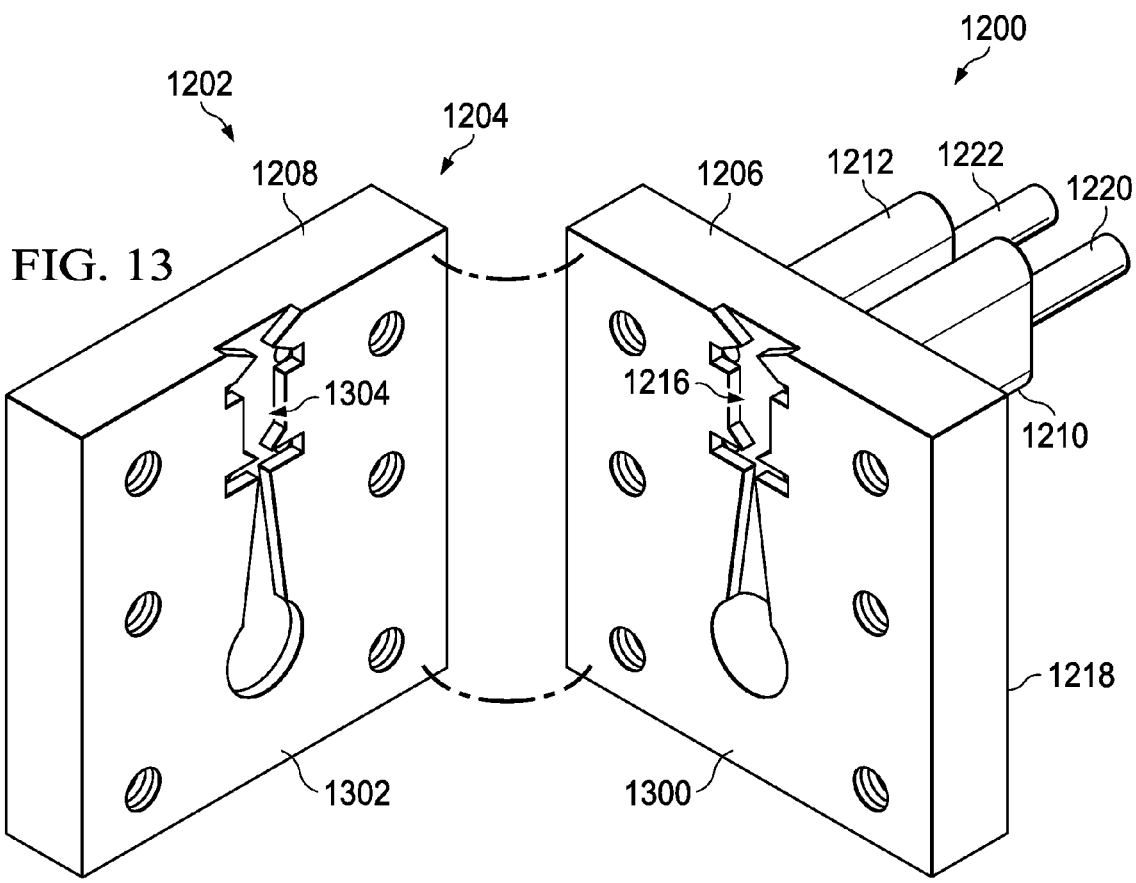
FIG. 13 is an illustration of a view of inner sides of planar members in a flow control actuator in accordance with an illustrative embodiment.

Turning now to FIG. 13, an illustration of a view of inner sides of planar members in a flow control actuator is depicted in accordance with an illustrative embodiment. In this example, inner side 1300 for first planar member 1206 and inner side 1302 for second planar member 1208 are shown. In this illustrative example, chamber 1304 is formed in both inner side 1300 of first planar member 1206 and inner side 1302 of second planar member 1208.

Figure 14:
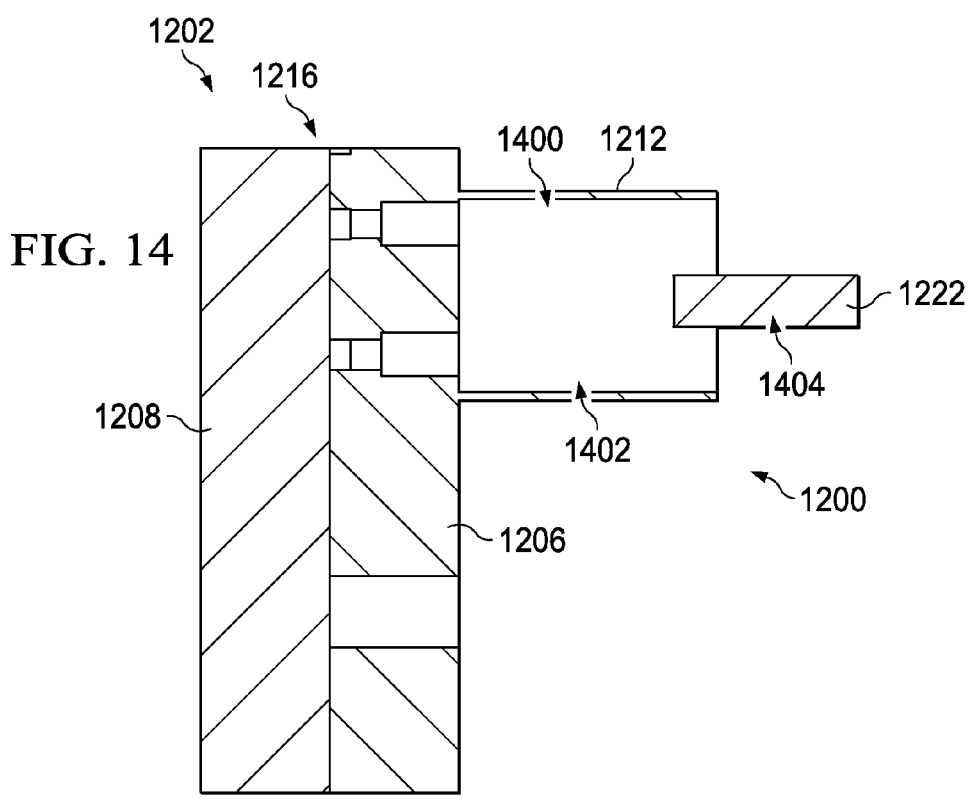
FIG. 14 is an illustration of a cross-sectional view of a flow control actuator in accordance with an illustrative embodiment.

Turning now to FIG. 14, an illustration of a cross-sectional view of a flow control actuator is depicted in accordance with an illustrative embodiment. In this illustrative example, a cross-sectional view of flow control actuator 1200 is shown taken along lines 14-14 in FIG. 12.

As depicted, second secondary structure 1212 has secondary chamber 1400 with volume 1402. Further, second solenoid valve 1222 may change the size of volume 1402. When second solenoid valve 1222 is open, volume 1404 within second solenoid valve 1222 is in communication with volume 1402 of secondary chamber 1400. In other words, volume 1404 in second solenoid valve 1222 is added to volume 1402 in secondary chamber 1400 of second secondary structure 1212 to increase the size of volume 1402.

When second solenoid valve 1222 is closed, volume 1402 is reduced in size. In this state, volume 1404 in second solenoid valve 1222 is no longer in communication with volume 1402.

The different components shown in FIG. 1 and FIGS. 3-14 may be combined with components in FIG. 2, used with components in FIG. 2, or a combination of the two. Additionally, some of the components in FIG. 1 and FIGS. 3-14 may be illustrative examples of how components shown in block form in FIG. 2 can be implemented as physical structures.

Figure 15:
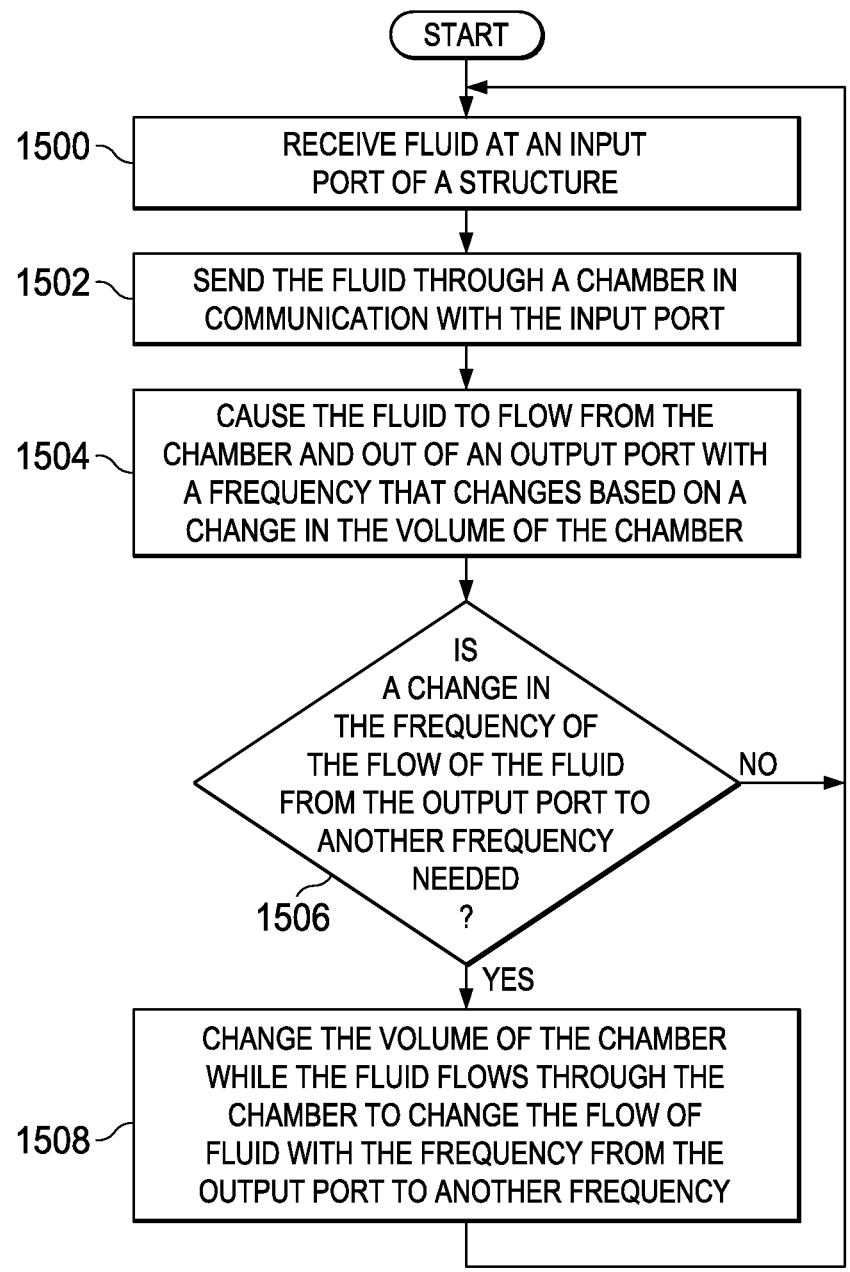
FIG. 15 is an illustration of a flowchart of a process for managing flow of fluid in accordance with an illustrative embodiment.

With reference now to FIG. 15, an illustration of a flowchart of a process for managing flow of fluid is depicted in accordance with an illustrative embodiment. The process illustrated in FIG. 15 may be implemented in flow control actuator 200 in FIG. 2. In particular, the process may be implemented using flow control actuator 200 in aircraft 100 in FIG. 1 or some other suitable type of platform.

The process begins by receiving fluid at an input port of a structure (operation 1500). The process then sends the fluid through a chamber in communication with the input port (operation 1502). The process then causes the fluid to flow from the chamber and out of an output port with a frequency that changes based on a change in the volume of the chamber (operation 1504). A determination is made as to whether a change in the frequency of the flow of the fluid from the output port to another frequency is needed (operation 1506). If a change is not needed, the process returns to operation 1500. Otherwise, the process changes the volume of the chamber while the fluid flows through the chamber to change the flow of fluid with the frequency from the output port to another frequency (operation 1508), with the process then returning to operation 1500. These operations may occur until fluid flow is no longer desired from the structure.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, segment, function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 16:
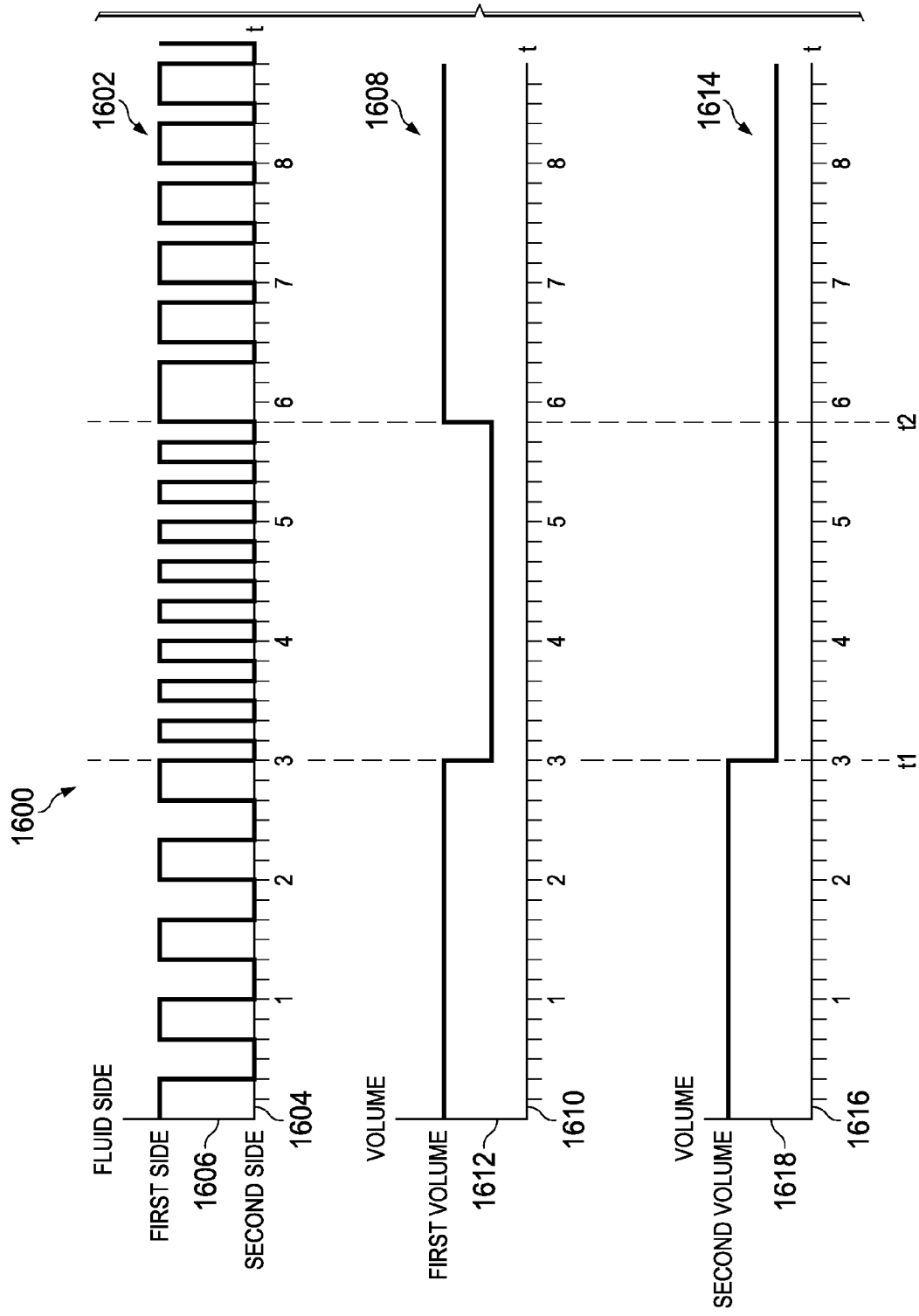
FIG. 16 is an illustration of timing diagrams for a flow control actuator in accordance with an illustrative embodiment.

Turning now to FIG. 16, an illustration of timing diagrams for a flow control actuator is depicted in accordance with an illustrative embodiment. Timing diagrams 1600 are examples of timing diagrams that may be generated for flow control actuator 200 in FIG. 2. Timing diagram 1602 illustrates oscillations in the flow of fluid at output port 208 in FIG. 2. X-axis 1604 represents time, while Y-axis 1606 represents a side at which fluid flow occurs at output port 208.

Timing diagram 1608 illustrates a change in first volume 226 in first secondary chamber 222. X-axis 1610 represents time, while time Y-axis 1612 represents a size for first volume 226.

Next, timing diagram 1614 illustrates a change in second volume 228 in second secondary chamber 224. X-axis 1616 represents time, while time Y-axis 1618 represents a size for second volume 228.

As can be seen in this illustrative example, first volume 226 and second volume 228 do not change until time T1. During this period of time, the frequency of oscillation of the fluid flowing from output port 208 remains unchanged. When first volume 226 and second volume 228 are reduced at time T1, the frequency of the oscillation of the fluid flowing from output port 208 changes in a manner that increases the frequency at which the fluid flowing at output port 208 moves from side to side.

At time T2, the size of first volume 226 changes while the size of second volume 228 does not change. This change of first volume 226 results in the fluid flowing from output port 208 with a movement between the first side and the second side of output port 208 such that the fluid stays on the first side for a longer period of time than on the second side. When only one of first volume 226 and second volume 228 changes, the flow of fluid stays on the side corresponding to the chamber that has a larger volume for a longer period of time than the other side that has a smaller volume.

Figure 17:
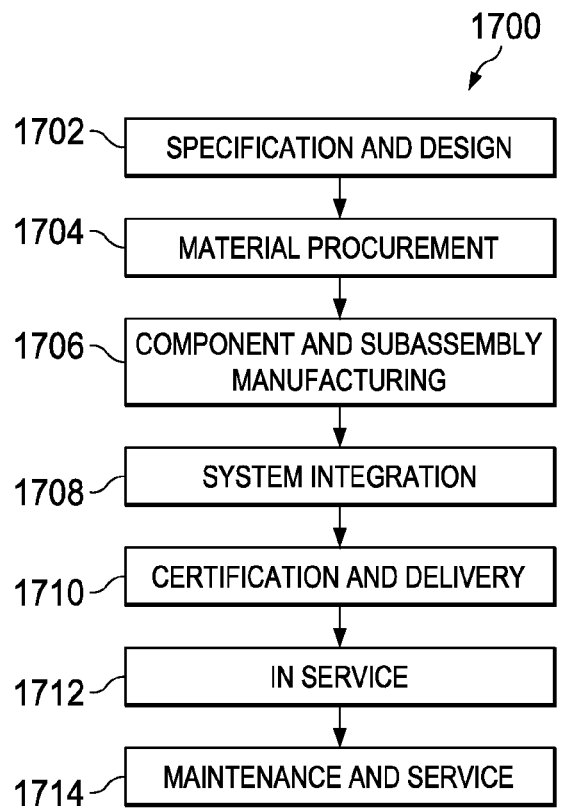
FIG. 17 is an illustration of an aircraft manufacturing and service method in accordance with an illustrative embodiment.
Figure 18:
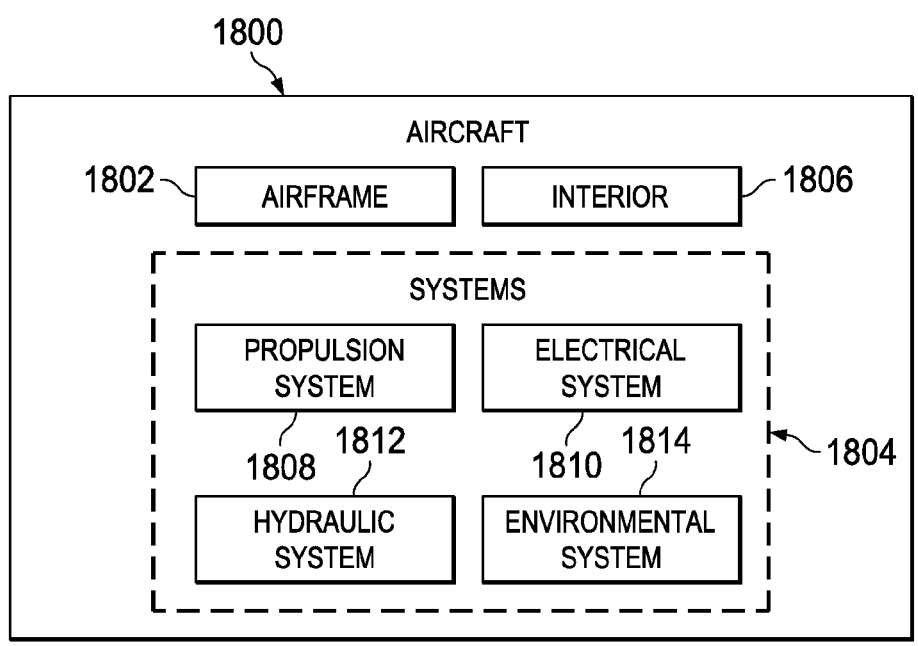
FIG. 18 is an illustration of an aircraft in which an illustrative embodiment may be implemented.

Illustrative embodiments of the disclosure may be described in the context of aircraft manufacturing and service method 1700 as shown in FIG. 17 and aircraft 1800 as shown in FIG. 18. Turning first to FIG. 17, an illustration of an aircraft manufacturing and service method is depicted in accordance with an illustrative embodiment. Flow control actuator 200 and the components found in flow control actuator 200 may be manufactured or reconfigured in the steps shown in this figure. During pre-production, aircraft manufacturing and service method 1700 may include specification and design 1702 of aircraft 1800 in FIG. 18 and material procurement 1704.

During production, component and subassembly manufacturing 1706 and system integration 1708 of aircraft 1800 in FIG. 18 takes place. Thereafter, aircraft 1800 in FIG. 18 may go through certification and delivery 1710 in order to be placed in service 1712. While in service 1712 by a customer, aircraft 1800 in FIG. 18 is scheduled for routine maintenance and service 1714, which may include modification, reconfiguration, refurbishment, and other maintenance or service.

Each of the processes of aircraft manufacturing and service method 1700 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 18, an illustration of an aircraft is depicted in which an illustrative embodiment may be implemented. In this example, aircraft 1800 is produced by aircraft manufacturing and service method 1700 in FIG. 17 and may include airframe 1802 with plurality of systems 1804 and interior 1806. Examples of systems 1804 include one or more of propulsion system 1808, electrical system 1810, hydraulic system 1812, and environmental system 1814. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1700 in FIG. 17. For example, flow control actuators may be designed for use in aircraft 1800 during specification and design 1702. The flow control actuators may be manufactured during component and subassembly manufacturing 1706 and installed during system integration 1708. In these illustrative examples, the flow control actuators may be tested during certification and delivery 1710 and used to control the flow of fluids while in service 1712. Additionally, flow control actuators may be added or replaced during maintenance, upgrades, or refurbishment in maintenance and service 1714.

Thus, the illustrative embodiments provide a method and apparatus for controlling the flow of a fluid out of a flow control actuator. In the illustrative embodiments, the frequency at which fluid changes directions when flowing out of an output port in a flow control actuator may be changed. This frequency or sweeping of the fluid flow may be changed in a manner that does not require a change in the pressure of fluid input into the flow control actuator at an input port. In this manner, the amount of fuel or energy needed to operate a fluid source may be reduced. Further, by maintaining the flow of fluid at substantially the same level, changes in fluid flow may not occur that may affect the control being initiated using a fluid flow actuator.

The description of the different illustrative embodiments has been presented for purposes of illustration and description, and is not intended to be exhaustive or limited to the embodiments in the form disclosed. Many modifications and variations will be apparent to those of ordinary skill in the art.

Although the illustrative examples for an illustrative embodiment are described with respect to an aircraft, an illustrative embodiment may be applied to other types of platforms. The platform may be, for example, a mobile platform, a stationary platform, a land-based structure, an aquatic-based structure, and a space-based structure. More specifically, the platform may be a surface ship, a tank, a personnel carrier, a train, a spacecraft, a space station, a satellite, a submarine, an automobile, a power plant, a bridge, a dam, a manufacturing facility, a building, and other suitable objects.

Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a structure comprising: to an opening and an output port, such that a central axis of the output port aligns with a diameter of the opening, the opening being directly connected to an input port and a main chamber;
   a first planar member connected to a second planar member such that the connection forms the main chamber comprising: a first section connected to a second section via a rectangular section, a first side of the second section being substantially parallel to a second side of the second section;
   the rectangular section connected to the second section:
      directly; and
      via a first secondary chamber and a second secondary chamber, such that the rectangular section comprises a length substantially perpendicular to and symmetrical about the central axis, an opening to the first secondary chamber extends perpendicular to the length and through the first planar member from a first end of the length, and an opening to the second secondary chamber extends perpendicular to the length and through the first planar member from a second end of the length;

at least one of: a first volume of the first secondary chamber, and a second volume of the second secondary chamber, being variable such that a fluid flows, at a substantially constant pressure, into the opening, and out the output port in a sweeping motion comprising a variable frequency.

2. The apparatus of claim 1, such that the structure further comprises:
the first secondary chamber and the second secondary chamber being external to the first planar member;
a length of the first secondary chamber being substantially perpendicular to the length of the rectangular section; and
a length of the second secondary chamber being substantially perpendicular to the length of the rectangular section.

3. The apparatus of claim 1, further comprising:
the first secondary chamber being in communication with the main chamber through the opening to the first secondary chamber and a second opening to the first secondary chamber, and wherein the second secondary chamber is in communication with the main chamber through the opening to the second secondary chamber and a second opening to the second secondary chamber; and
the variable frequency comprises the sweeping motion of the fluid between a first side of the output port and a second side of the output port.

4. The apparatus of claim 1, wherein the main chamber comprises:
the first section configured to receive the fluid, at the substantially constant pressure, from the input port and cause the fluid to flow at a desired rate when exiting the first section, such that, in operation, the first section receives the fluid, at the substantially constant pressure, from the input port and causes the fluid to flow at the desired rate when exiting the first section; and
the second section shaped such that the fluid alternates between flowing along the first side and the second side in the second section, and the output port being configured to cause the fluid flowing between the first side and second side in the second section to sweep with the frequency between a first side of the output port and a second side of the output port, such that, in operation, the output port causes the fluid flowing between the first side and second side in the second section to sweep with the frequency between the first side of the output port and the second side of the output port.

5. The apparatus of claim 4, wherein the first secondary chamber and the second secondary chamber are in communication with the second section of the main chamber, wherein at least one of the first secondary chamber and the second secondary chamber is configured to change the volume of the chamber.

6. The apparatus of claim 2 further comprising:
a first actuator configured to move into and out of the first secondary chamber to change the first volume in the first secondary chamber; and
a second actuator configured to move into and out of the second secondary chamber to change to the second volume in the second secondary chamber.

7. The apparatus of claim 2, wherein an amount of change selected in at least one of the first secondary chamber and the second secondary chamber affects a first amount of time that the fluid flows on the first side of the second section and a second amount of time that the fluid flows on the second side of the second section.

8. The apparatus of claim 1, wherein each secondary chamber comprises at least one of: a shape memory material, and an elastic material.

9. The apparatus of claim 1, wherein the structure is comprised of a material selected from one of a metal, a plastic, steel, aluminum, titanium, and polycarbonate.

10. The apparatus of claim 1, wherein the fluid is selected from one of air, a liquid fuel, and a gas fuel, and a width of the first section, at a first end of the first section connected to the opening, being wider than a width of the first section at a second end of the first section that connects to the rectangular section.

11. A fluidic oscillator comprising:
a structure comprising first planar member and a second planar member connected to form a main chamber comprising:
an opening connected to an input port, and an output port;
a first section directly connected to the opening, and connected to a second section via a rectangular section; and
the second section comprising a first side substantially parallel to a second side, such that a fluid flows from the input port through the main chamber such that the fluid contacts the first side while a first absence of fluid exists on a portion of the second side, and alternately, the fluid contacts the second side while a second absence of fluid exists on a portion of the first side;
the rectangular section connected to the second section:
directly; and
via a first secondary chamber and a second secondary chamber, and comprising a length being substantially perpendicular to and symmetrical about a central axis shared by: the first section, the second section, the output port, and a diameter of the opening, such that an opening to the first secondary chamber extends perpendicular to the length and through the first planar member from a first end of the length, and an opening to the second secondary chamber extends perpendicular to the length and through the first planar member from a second end of the length, a volume of the first secondary chamber, and a volume of the second secondary chamber, each being variable to control a flow of the fluid, that enters the opening at a constant pressure, through the second section and out the output port in a sweeping motion comprising a variable frequency.

12. The fluidic oscillator of claim 11, wherein at least one of: the first secondary chamber, and the second secondary chamber, is configured to change the volume of the main chamber, such that, in operation, at least one of: the first secondary chamber, and the second secondary chamber, changes the volume of the main chamber, wherein the volume of the main chamber is configured to change, via using at least one of: a shape memory metal, and an elastic material, such that the frequency at which the fluid sweeps at the output port changes, such that, in operation, the volume of the main chamber changes, via using at least one of: a shape memory metal, and an elastic material, such that the frequency at which the fluid sweeps at the output port changes.

13. A method for managing a flow of a fluid, the method comprising:
forming a structure comprising a chamber comprising a main chamber, a first secondary chamber, and a second secondary chamber, via:

connecting a first planar member to a second planar member and forming the main chamber comprising a first section and a second section, the second section comprising a first side being substantially parallel to a second side;

connecting the first section directly to a rectangular section directly connected to the second section, and connecting the rectangular section to the second section via the first secondary chamber and the second secondary chamber, such that the rectangular section comprises a length substantially perpendicular to and symmetrical about a central axis of an output port, the central axis being substantially parallel to the first side and the second side;

extending an opening, to the first secondary chamber, perpendicular to the length and through the first planar member, from a first end of the length;

extending an opening, to the second secondary chamber, perpendicular to the length and through the first planar member, from a second end of the length; and extending the first secondary chamber and the second secondary chamber outward from the first planar member on a side of the first planar member farthest from the second planar member;

receiving the fluid, comprising a substantially constant pressure, at an input port of the structure;

sending the fluid through the chamber and adjusting a volume of the first secondary chamber and the second secondary chamber such the fluid contacts the first side of the second section while a first absence of fluid exists on a portion of the second side of the second section, and alternately, the fluid contacts the second side while a second absence of fluid exists on a portion of the first side, causing the fluid to flow from the second section and out of the output port in a sweeping motion comprising a frequency.

14. The method of claim 13 further comprising:
changing the volume of the secondary chamber while the fluid flows through the chamber, thus changing the frequency to another frequency.

15. The method of claim 13, further comprising:
the main chamber in communication with the input port and the output port and,
wherein changing the volume of at least one of: the first secondary chamber, and the second secondary chamber, via activating a solenoid.

16. The method of claim 13, wherein changing the frequency at which the fluid flows out of the output port comprises changing the sweeping motion of the fluid between a first side of the output port and a second side of the output port.

17. The method of claim 15, further comprising:
the first section causing the fluid to flow at a desired rate when exiting the first section; and
the second section causing the fluid to move between a first side and a second side in the second section thus causing the fluid flowing between the first side and second side, in the second section, to exit the output port, sweeping with the frequency that is variable between: a first amount of time the flow spends on a first side of the output port, and a second amount of time the flow spends on a second side of the output port.

18. The method of claim 17, further comprising at least one of: the first secondary chamber, and the second secondary chamber, changing the volume of the chamber via moving at least one of:
a first actuator in the first secondary chamber thus changing a first volume in the first secondary chamber thereby changing the volume of the chamber; and
a second actuator associated with the second secondary chamber thus changing a second volume in the second secondary chamber thereby changing the volume of the chamber.

* * * * *